July 11, 1933.    L. A. PAZANDAK    1,918,213
DRAWBAR DEVICE FOR HARROWS
Filed Jan. 7, 1931    2 Sheets-Sheet 1
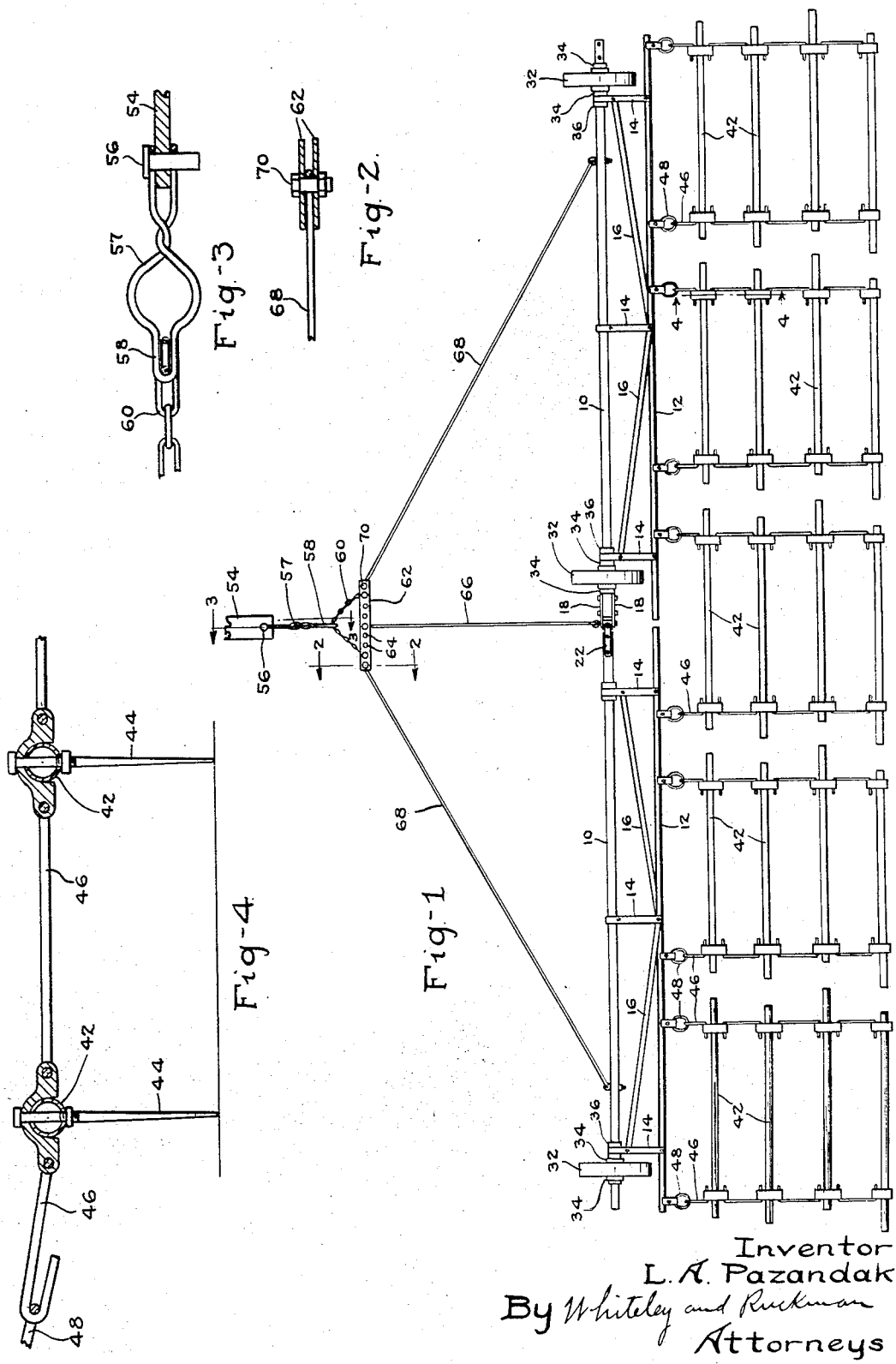
Inventor:
L. A. Pazandak.
By Whiteley and Ruckman
Attorneys July 11, 1933. L. A. PAZANDAK 1,918,213
DRAWBAR DEVICE FOR HARROWS
Filed Jan. 7, 1931 2 Sheets-Sheet 2
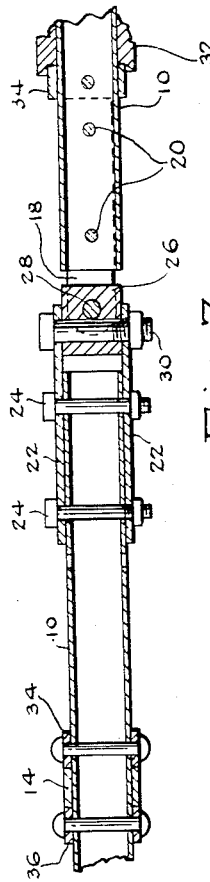
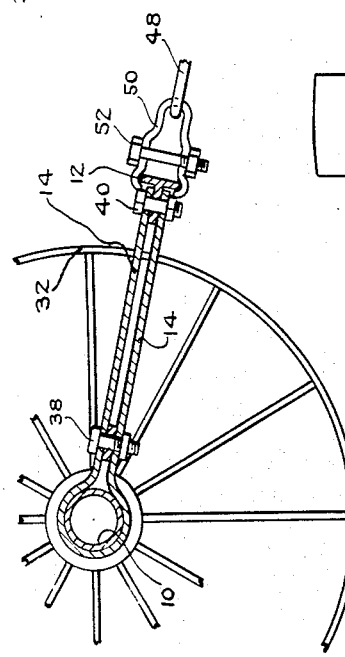
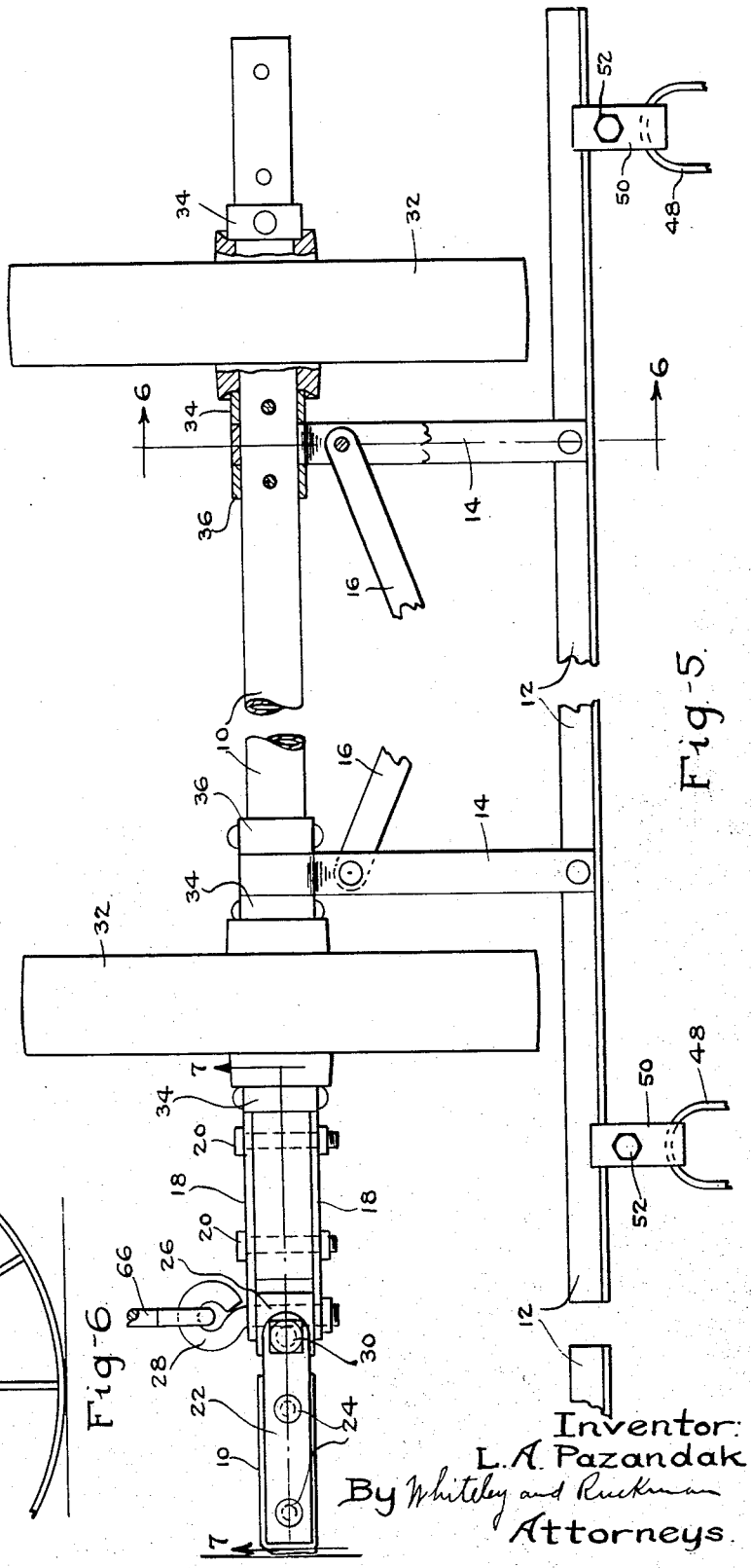
Inventor:
L. A. Pazandak.
By Whiteley and Ruckman
Attorneys.

Patented July 11, 1933

1,918,213

UNITED STATES PATENT OFFICE

LOUIS A. PAZANDAK, OF MINNEAPOLIS, MINNESOTA, ASSIGNOR TO JAMES L. TUCKER, OF MINNEAPOLIS, MINNESOTA

DRAWBAR DEVICE FOR HARROWS

Application filed January 7, 1931. Serial No. 507,142.

My invention relates to draw-bar devices for harrows. Among the objects of the invention are the provision of transverse bar members to which harrow sections are attached, said bar members being so constructed and arranged that the harrow sections will accommodate themselves to irregularities of the ground and will be capable of horizontal swinging movements of such character that they may be more readily turned when the end of a field is reached during the harrowing operation. In carrying out my invention, I preferably provide a plurality of transverse bar members swingingly connected together in alinement with each other, means for attaching harrow sections at the rear of the bar members, and a hitch device attached at the front of the bar members in order that the harrow sections may be pulled along the ground to be harrowed by any suitable source of power.

The full objects and advantages of my invention will appear in connection with the detailed description thereof, and the novel features of my inventive idea will be particularly pointed out in the claims.

In the accompanying drawings which illustrate one form in which my invention may be embodied,—

Fig. 1 is a top plan view of the device attached to harrow sections. Fig. 2 is a view in section on the line 2—2 of Fig. 1. Fig. 3 is a view in section on the line 3—3 of Fig. 1. Fig. 4 is a view in section on the line 4—4 of Fig. 1. Fig. 5 is an enlarged top view of the device with parts broken away. Fig. 6 is a view in section on the line 6—6 of Fig. 5. Fig. 7 is a view in section on the line 7—7 of Fig. 5.

In carrying out my invention, I provide a plurality of main bar members 10 hinged together and shown in Fig. 1 as being two in number and also provide a plurality of auxiliary bar members 12 attached respectively to the main bar members by connections such as straps 14 and inclined brace bars 16. As will be understood from Fig. 5, the members 10 preferably consist of pipe sections and as will be understood from Figs. 5 and 6 the members 12 are T-shaped in cross section. The manner in which the members 10 are swingingly connected together is shown in Figs. 5 and 7. Two plates 18 are secured by bolts 20 to an end of one of the members 10 on diametrically opposite sides thereof while two plates 22 are secured by bolts 24 to an adjacent end of another of the members 10 on diametrically opposite sides thereof. The plates 18 and 22 extend out somewhat from the ends of the members to which they are secured and the plates 18 have an angular relationship of 90° to plates 22. A block 26 is placed between the ends of the plates 18 and 22 as thus disposed and a horizontal pivot bolt 28 passes through the plates 18 and the block 26 while a vertical pivot bolt 30 passes through the plates 22 and the block. It will therefore be understood that the pivot 28 allows the members 10 to swing vertically with relation to each other and that the pivot 30 allows the members 10 to swing horizontally with relation to each other, these swinging movements being for a purpose which will appear later. The members 10 are preferably provided with wheels 32 mounted for rotation thereon and held in place by collars 34 secured to the members 10 and engaging the ends of the hubs of the wheels. The forward ends of some of the straps 14 are held in place by being disposed between the collars 34 and additional collars 36 which are also secured to the members 10. By referring to Fig. 6, it will be seen that the straps 14 are doubled with the doubled portions thereof curved to fit around the members 10 and held together to the desired extent by bolts 38 while the ends of the straps 14 are secured to the flanges of the members 12 by bolts 40. As will be understood from Fig. 1, a number of harrow sections or frames 42 having teeth 44 as shown in Fig. 4 are attached to the auxiliary bar members 12. For this purpose, hook members 46 are pivoted to the forward ends of the sections 42, the members 46 being hooked into ring-like or curved members 48 which engage with clamps 50 clamped to the bar members 12 by bolts 52. In order to draw the harrow sections over the ground through the intervention of the bar members 10 and 12, a suitable hitch device is provided. As shown, there is a bar 54 which is connected with a tractor or any other suitable source of power. A looped or open center member 57 extends from the rear of the bar 54 being attached thereto by a bolt 56. As best shown in Fig. 3, the rear of the loop member 57 is provided with a narrowed extension 58 adapted to receive the middle portion of a short chain 60. The ends of the chain 60 are attached to a transverse member or hitch bar 62 near the respective ends of the latter. The transverse member 62 consists of two similar plates spaced slightly from each other and provided with a series of holes 64 so that the member 62 may be connected with the bar members 10 by means of a rod 66 extending directly rearward and rods 68 which incline outwardly from the transverse member 62. As will be understood from Fig. 2, the forward ends of the rods 66 and 68 have hooks which lie between the two plates of the member 62 so that these ends of the rods may be pivotally attached by bolts 70 passing through the hooks and through the holes 64. It will be noted from Fig. 1 that the rear ends of the rods are pivotally attached to the bar members 10, the rod 66 being attached to the right hand member 10 adjacent the place where it is attached to the left hand member 10.

The operation and advantages of my invention will be apparent in connection with the foregoing description. While I have shown two bar members 10 and two corresponding bar members 12, it will be understood from Fig. 1 that more than two may be employed if desired. The additional holes in the transverse member 62 provide for attachment of the requisite additional rods such as 68 while the fact that the ends of the bars 10 are respectively provided with plates 18 and 22 renders it easy to hinge together any desired number of bars 10. The manner in which the straps 14 are attached provides for the addition of the corresponding number of bars 12. The horizontally extending pivot 28 allows the members 10 to swing vertically with relation to each other so that the harrow sections readily accomodate themselves to inequalities of the ground being harrowed, while the vertically extending pivot 30 allows the members 10 to swing horizontally with relation to each other so that the device with the harrow sections attached thereto may be readily turned when the end of the field is reached. It will be noted from Fig. 3 that the chain 60 is prevented from sliding in the loop member 57 on account of one of the chain links being engaged in the comparatively narrow extension 58. The connection of the chain with the loop member 57 may be readily adjusted by backing the tractor slightly and pulling the chain forward so that different ones of the chain links may be engaged in the extension 58. It will be noted that the clamps 50 are adjustable along the bars 12 so that adjustment can be readily made for different makes and sizes of harrows; also that the pull on the harrows will be directly forward. It will be further understood that the auxiliary bars 12 are connected with the main bars 10 for up and down swinging movement.

I claim:

1. A draw-bar device for harrows comprising a plurality of transverse main bar members connected together in alinement for swinging movement relatively to each other both vertically and horizontally, means for attaching harrow sections at the rear of said members, a transverse hitch bar, rods connecting said hitch bar with the front of said members, a chain having its ends attached to said hitch bar, and an open center member through which said chain passes.

2. A draw-bar device for harrows comprising a plurality of transverse main bar members connected together in alinement for swinging movement relatively to each other both vertically and horizontally, means for attaching harrow sections at the rear of said members, a transverse hitch bar, rods connecting said hitch bar with the front of said members, a chain having its ends attached to said hitch bar, and an open center member having a narrowed rearward extension, said extension being adapted to retain said chain in place by its engagement with one of the links of said chain.

3. A draw-bar device for harrows comprising a plurality of transverse main bar members connected together in alinement for swinging movement relatively to each other both vertically and horizontally, said bar members being cylindrical in form, straps rotatably attached to said bar members and extending rearwardly therefrom, auxiliary bar members secured to the rear of said straps for attachment of harrow sections, and a hitch device attached at the front of said main members.

4. A draw-bar device for harrows comprising a plurality of transverse main bar members connected together in alinement for swinging movement relatively to each other both vertically and horizontally, said bar members being cylindrical in form, straps rotatably attached to said bar members and extending rearwardly therefrom, auxiliary bar members T-shaped in cross-section and secured to the rear of said straps, clamps attached for adjustment along said T-bar members for attachment of harrow sections, and a hitch device attached at the front of said main members.

5. A draw-bar device for harrows comprising at least two transverse main bar members connected together in alinement for swinging movement relatively to each other both vertically and horizontally, means for attaching harrow sections at the rear of said members, a transverse hitch bar, outwardly inclined rods connecting the end portions of said hitch bar with the end portions of said main bar members, and a longitudinally extending rod connecting the middle of said hitch bar with one of said main bar members adjacent its place of connection with the other main bar member.

6. A draw-bar device for harrows comprising two transverse bar members, two plates secured to and extending out from an end of one of said members, said plates being parallel to each other, two plates secured to and extending out from an end of the other of said members past the free ends of said first-mentioned plates, said last-mentioned plates being parallel to each other and having an angular relationship of 90° to said first plates, a block positioned between the ends of the two sets of plates, a horizontal pivot passing through said block and one set of plates, a vertical pivot passing through said block and the other set of plates, means for attaching harrow sections at the rear of said transverse members, and a hitch device attached at the front of said transverse members.

In testimony whereof I hereunto affix my signature.

LOUIS A. PAZANDAK.